(12) United States Patent
Noda

(10) Patent No.: US 11,586,168 B2
(45) Date of Patent: Feb. 21, 2023

(54) STORAGE MEDIUM AND PLC SYSTEM CONSTRUCTION SUPPORT DEVICE

(71) Applicant: Mitsubishi Electric Corporation, Tokyo (JP)

(72) Inventor: Koichiro Noda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/762,739

(22) PCT Filed: Nov. 18, 2019

(86) PCT No.: PCT/JP2019/045010
§ 371 (c)(1),
(2) Date: Mar. 23, 2022

(87) PCT Pub. No.: WO2021/100071
PCT Pub. Date: May 27, 2021

(65) Prior Publication Data
US 2022/0342378 A1   Oct. 27, 2022

(51) Int. Cl.
*G05B 19/05*   (2006.01)

(52) U.S. Cl.
CPC .. *G05B 19/056* (2013.01); *G05B 2219/15011* (2013.01)

(58) Field of Classification Search
CPC ............... G05B 19/056; G05B 2219/15011
See application file for complete search history.

(56) References Cited

U.S. PATENT DOCUMENTS

| | | | |
|---|---|---|---|
| 2012/0242648 A1* | 9/2012 | Baier | G05B 19/409 |
| | | | 345/418 |
| 2013/0268127 A1* | 10/2013 | Casilli | G05D 23/19 |
| | | | 700/276 |

(Continued)

FOREIGN PATENT DOCUMENTS

| | | |
|---|---|---|
| JP | 2010-160582 A | 7/2010 |
| JP | 2017-111563 A | 6/2017 |

(Continued)

OTHER PUBLICATIONS

International Search Report and Written Opinion dated Jan. 21, 2020, received for PCT Application PCT/JP2019/045010, Filed on Nov. 18, 2019, 8 pages including English Translation.

(Continued)

*Primary Examiner* — Christopher E. Everett
(74) *Attorney, Agent, or Firm* — Xsensus LLP

(57) ABSTRACT

A PLC system construction support program for creating a system configuration diagram depicting a configuration of a PLC system constructed causes a computing terminal to function as: an image acquisition section that acquires image data of an image of the PLC system; a system configuration recognition section that creates system configuration information including arrangement information and selected unit information; a system configuration diagram generation section that creates a system configuration diagram based on the system configuration information; and a system configuration diagram editor section that performs display processing for displaying the system configuration diagram on a display section.

7 Claims, 17 Drawing Sheets

(56) References Cited

U.S. PATENT DOCUMENTS

| | | | |
|---|---|---|---|
| 2014/0061293 A1* | 3/2014 | Jayaprakash | G06F 16/9554 |
| | | | 235/494 |
| 2016/0274552 A1* | 9/2016 | Strohmenger | G05B 11/01 |
| 2019/0029686 A1 | 1/2019 | Agarwal et al. | |
| 2019/0296986 A1 | 9/2019 | Ikeo | |

FOREIGN PATENT DOCUMENTS

| | | |
|---|---|---|
| JP | 2019-169089 A | 10/2019 |
| WO | 2016/113843 A1 | 7/2016 |

OTHER PUBLICATIONS

Decision to Grant a Patent dated Aug. 11, 2020, received for Japanese Application 2020-527973, 6 pages including English Translation.

\* cited by examiner

| UNIT NAME | UNIT APPEARANCE IMAGE | UNIT FEATURE IMAGE |
|---|---|---|
| AA | aa | aa |
| BB | bb | bb |
| CC | cc | cc |

FIG.11

| UNIT NAME | UNIT APPEAR-ANCE IMAGE | UNIT FEATURE IMAGE | UNIT DIMENSIONS |
|---|---|---|---|
| AA | aa | aa | VERTICAL: 120 HORIZONTAL: 40 |
| BB | bb | bb | VERTICAL: 120 HORIZONTAL: 40 |
| CC | cc | cc | VERTICAL: 120 HORIZONTAL: 80 |
| DD |  | — | VERTICAL: 120 HORIZONTAL: 40 |
| EE |  | — | VERTICAL: 120 HORIZONTAL: 40 |

| SLOT NUMBER | UNIT NAME | UNIT MODEL NAME | MATCH DEGREE |
|---|---|---|---|
| NO. 0 | CC | cc | 100% |
| NO. 1 | AA | aa | 100% |
| NO. 2 | — | — | — |
| NO. 3 | BB | bb | 100% |
| NO. 4 | — | — | — |
| NO. 5 | DD | — | 95% |
| | EE | — | 80% |
| NO. 6 | — | — | — |

| SLOT NUMBER | NO. 0 | NO. 1 | NO. 2 | NO. 3 | NO. 4 | NO. 5 | | NO. 6 |
|---|---|---|---|---|---|---|---|---|
| UNIT NAME | CC | AA | — | BB | — | DD | EE | — |
| UNIT MODEL NAME | cc | aa | — | bb | — | — | — | — |
| MATCH DEGREE | 100% | 100% | — | 100% | — | 95% | 80% | — |

FIG.19

| UNIT NAME | UNIT APPEARANCE IMAGE | UNIT FEATURE IMAGE | UNIT DIMENSIONS | SUBSTITUTE UNIT | PRODUCTION INFORMATION | UNIT PRICE |
|---|---|---|---|---|---|---|
| AA |  | aa | VERTICAL: 120 HORIZONTAL: 40 | AA—A AA—A1 | OUT OF PRODUCTION ON XX/XX/XXXX | ¥80,000 |
| BB |  | bb | VERTICAL: 120 HORIZONTAL: 40 | BB—B | SCHEDULED TO GO OUT OF PRODUCTION ON YY/YY/YYYY | ¥70,000 |
| CC |  | cc | VERTICAL: 120 HORIZONTAL: 80 | — | IN PRODUCTION | ¥40,000 |
| AA—A |  | aa—a | VERTICAL: 120 HORIZONTAL: 40 | — | IN PRODUCTION | ¥70,000 |
| AA—A1 |  | aa—a1 | VERTICAL: 120 HORIZONTAL: 40 | — | IN PRODUCTION | ¥75,000 |
| BB—B |  | bb—b | VERTICAL: 120 HORIZONTAL: 40 | — | IN PRODUCTION | ¥90,000 |

FIG.20

| SLOT NUMBER | UNIT NAME | UNIT MODEL NAME | PRODUCTION INFORMATION | SUBSTITUTE UNIT | UNIT PRICE |
|---|---|---|---|---|---|
| NO. 0 | CC | cc | IN PRODUCTION | — | ¥40,000 |
| NO. 1 | AA | aa | OUT OF PRODUCTION ON XX/XX/XXXX | AVAILABLE | ¥80,000 |
| | AA—A | aa—a | — | AA—A | ¥70,000 |
| | AA—A1 | aa—a1 | — | AA—A1 | ¥75,000 |
| NO. 2 | — | — | — | — | — |
| NO. 3 | BB | bb | SCHEDULED TO GO OUT OF PRODUCTION ON YY/YY/YYYY | AVAILABLE | ¥70,000 |
| | BB—B | bb—b | — | BB—B | ¥90,000 |
| NO. 4 | — | — | — | — | — |
| NO. 5 | — | — | — | — | — |
| NO. 6 | — | — | — | — | — |

FIG.21

| SLOT NUMBER | NO. 0 | NO. 1 | | NO. 2 | NO. 3 | | NO. 4 | NO. 5 | NO. 6 |
|---|---|---|---|---|---|---|---|---|---|
| UNIT NAME | CC | AA | AA→A | — | BB | BB→B | — | — | — |
| UNIT MODEL NAME | cc | aa | aa→a | aa→a1 | bb | bb→b | — | — | — |
| PRODUCTION INFORMATION | IN PRODUCTION | OUT OF PRODUCTION | IN PRODUCTION | IN PRODUCTION | SCHEDULED TO GO OUT OF PRODUCTION | IN PRODUCTION | — | — | — |
| SUBSTITUTE UNIT | — | AA→A AA→A1 | — | — | BB→B | — | — | — | — |
| UNIT PRICE | ¥40,000 | ¥80,000 | ¥70,000 | ¥75,000 | ¥70,000 | ¥90,000 | — | — | — |

700b

STORAGE MEDIUM AND PLC SYSTEM CONSTRUCTION SUPPORT DEVICE

CROSS-REFERENCE TO RELATED APPLICATION

The present application is based on PCT filing PCT/JP2019/045010, filed Nov. 18, 2019, the entire contents of which are incorporated herein by reference.

FIELD

The present invention relates to a programmable logic controller (hereinafter simply referred to as "PLC") system construction support program, a storage medium readable by a computing terminal, and a PLC system construction support device for creating a PLC system configuration diagram for a PLC system actually constructed.

BACKGROUND

A PLC system used as a control device for industrial machines and the like is constructed by combining desired units. Examples of units constituting the PLC system include a power supply unit that is a power supply source, a CPU unit that controls the PLC system, an input unit that inputs signals of such as switches and sensors attached to a facility device or the like, an output unit that outputs control outputs to an actuator or the like, and a communication unit for connecting to a communication network. The PLC system is configured by, for example, attaching each unit to a baseboard including a slot to which each unit is attached, wiring for bypassing the power supply to each unit, and wiring for bypassing control signals to the units. Alternatively, the PLC system is configured without a baseboard and by connecting the units to each other to bypass the power supply and control signals to each of the units.

The PLC system controls the PLC system by transmitting control signals to each unit based on a user program stored in the CPU unit, and controls the operation of industrial machines, sensors, and the like connected to the PLC system.

A typical user program stored in the CPU unit is a ladder program or the like created using a PLC system program construction support device. Such a user program is created for an already configured PLC system, and the content of the user program to be created varies depending on the configuration of the PLC system, such as designated parameters and the memory address of each unit. That is, for creating a user program, it is necessary to understand how the PLC system has been constructed, for which a system configuration diagram is required identifying the type, model, product number, and the like of each unit constituting the PLC system and indicating the arrangement of the identified units.

A conventionally known PLC system construction support device is used to select constituent units and find a reasonable arrangement thereof before actually constructing a PLC system. The PLC system construction support device displays a list of various units selectable for constructing a PLC system, and in response to a user's selection of a first unit, displays candidates for the unit to be located next to the first unit as a prediction target candidate unit list based on past arrangement history information. The user selects the unit to be located next from the prediction target candidate unit list. This operation is repeated so as to create a system configuration diagram of the PLC system (see Patent Literature 1, for example).

A known method for creating a system configuration diagram for a PLC system actually constructed is to refer to connection information indicating electrical connections between various units included in the PLC system. In this method, the CPU unit included in the PLC system and the PLC system construction support device are made communicable through wireless or wired means, and information on various units electrically connected to the CPU unit is collected by the CPU unit. Then, the collected information is transmitted to the PLC system construction support device. The PLC system construction support device creates a system configuration diagram based on the transmitted information.

CITATION LIST

Patent Literature

Patent Literature 1: Japanese Patent Application Laid-open No. 2010-160582

SUMMARY

Technical Problem

However, the PLC system construction support device disclosed in Patent Literature 1 is used to find a reasonable arrangement for a PLC system before actually constructing the PLC system. That is, the PLC system construction support device is not meant to create a system configuration diagram of a PLC system actually constructed. Furthermore, because it is necessary to select a unit from each list, there is a possibility that the user may select a wrong unit due to their false recognition.

Regarding the method of creating a system configuration diagram based on connection information indicating electrical connections between various units included in the PLC system, while it is possible to create a system configuration diagram for a PLC system actually constructed, the creation of the system configuration diagram is impossible unless the PLC system and the PLC system construction support device are communicable. Therefore, it is necessary to prepare a communication environment. However, in a factory or the like having a complex manufacturing line, it may be difficult to prepare a communication environment, for example, it may be difficult to pass a communication cable for connecting the PLC system construction support device to the PLC system. Furthermore, if connection information cannot be read due to a failure in some unit electrically connected to the CPU unit, there is a possibility that the unit cannot be recognized, and the unit with no read-out connection information may be omitted from the system configuration diagram. In addition, if unit information (unit type, model, product number, and the like) is not recorded in the memory of some unit electrically connected to the CPU unit, the connection information itself can be read but cannot be used to identify the unit, which is problematic.

The present invention has been made to solve the above-described problems, and an object thereof is to provide a PLC system construction support program capable of creating a system configuration diagram for a PLC system actually constructed, a storage medium readable by a computing terminal and storing the PLC system construction support program, and a PLC system construction support device.

Solution to Problem

A PLC system construction support program according to the present invention is meant to create a system configuration diagram depicting a configuration of a PLC system constructed, and causes a computing terminal to function as: an image acquisition section that acquires image data of an image of the PLC system; a system configuration recognition section that creates arrangement information indicating arrangement of units from the image data, creates selected unit information by comparing the image data with unit information stored in a storage server and including feature information of units selectable for constructing a PLC system and selecting the units included in the image data, and creates system configuration information including the arrangement information and the selected unit information; a system configuration diagram generation section that creates a system configuration diagram based on the system configuration information; and a system configuration diagram editor section that performs display processing for displaying the system configuration diagram on a display section.

Advantageous Effects of Invention

According to the present invention, image data of an image of a PLC system are acquired. Arrangement information indicating the arrangement of the units is created from the acquired image data, and selected unit information is created by selecting each of the units included in the acquired image data. System configuration information is created in which the arrangement information and the selected unit information are associated with each other. A system configuration diagram is created based on the created system configuration information. Consequently, it is possible to create a system configuration diagram for a PLC system actually constructed while reducing or preventing selection of a wrong unit due to their false recognition by the user, avoiding the influence of environmental factors such as the preparation of a communication environment described above, and reducing or preventing lack of unit information.

BRIEF DESCRIPTION OF DRAWINGS

FIG. 11 is a diagram illustrating an example of unit information according to the second embodiment of the present invention.

FIG. 14 is a diagram illustrating an example of selected unit information according to the second embodiment of the present invention.

FIG. 15 is a diagram illustrating an example of system configuration information according to the second embodiment of the present invention.

FIG. 19 is a diagram illustrating an example of unit information according to the third embodiment of the present invention.

FIG. 20 is a diagram illustrating an example of selected unit information according to the third embodiment of the present invention.

FIG. 21 is a diagram illustrating an example of system configuration information according to the third embodiment of the present invention.

DESCRIPTION OF EMBODIMENTS

First Embodiment

Figure 1:
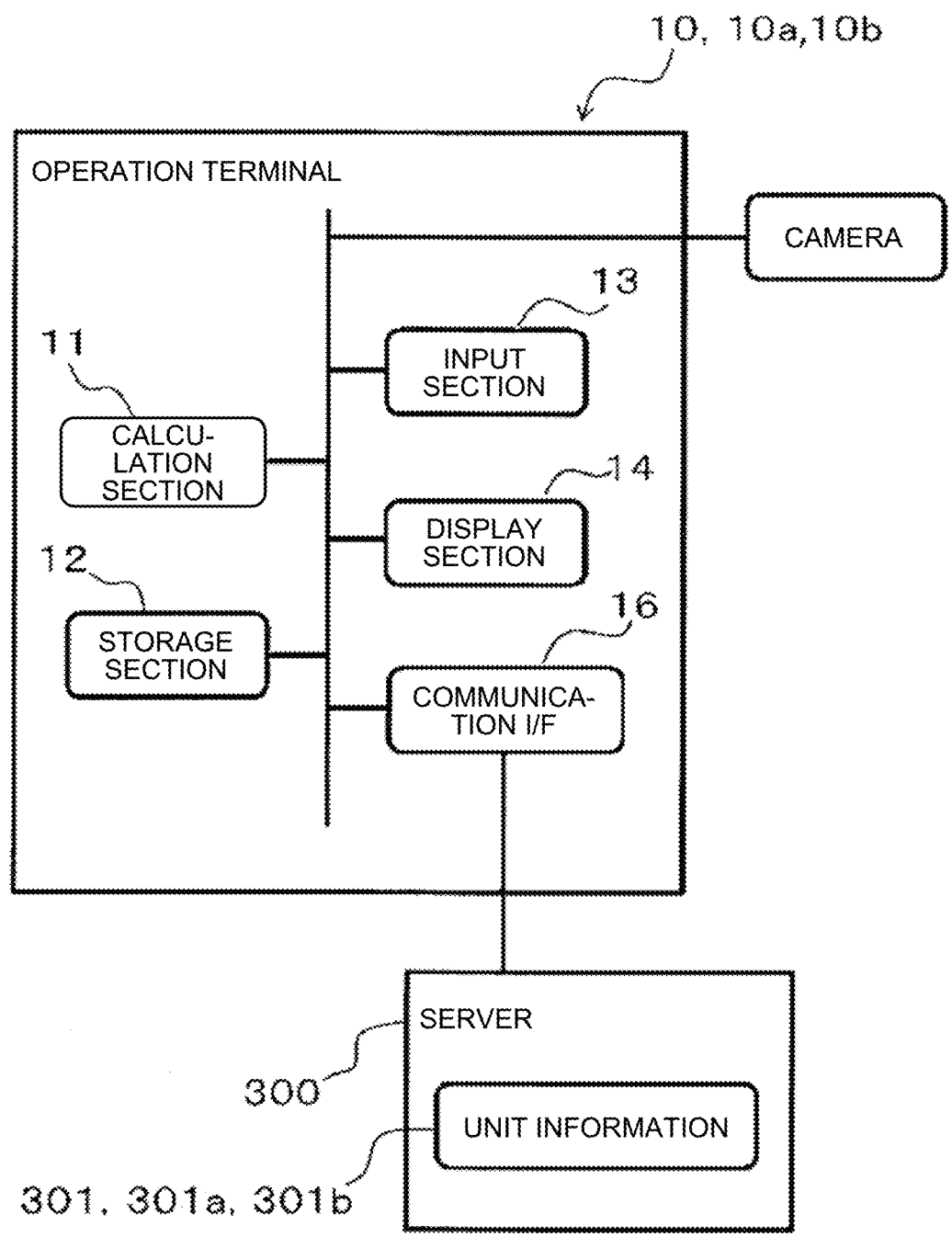
FIG. 1 is a diagram illustrating an exemplary hardware configuration of a PLC system construction support device according to an embodiment of the present invention.

A PLC system construction support program and a PLC system construction support device according to the first embodiment of the present invention will be described with reference to the drawings. FIG. 1 is a diagram illustrating an exemplary hardware configuration of a PLC system construction support device (hereinafter simply referred to as the "support device") 10. The support device 10 includes a calculation section 11 that executes the PLC system construction support program (hereinafter simply referred to as the "support program"), a storage section 12 that saves the support program and reads and writes data and commands, an input section 13 such as a keyboard, a mouse, and a touch panel, a display section 14 that displays the results of execution of the support program and the like, and a communication interface (communication I/F) 16 that communicates with an external server 300 and the like.

The storage section 12 includes a non-volatile storage section in which the installed support program is saved, and a volatile storage section that serves as a work memory when the support program is executed. Note that the support device 10 can be a computing terminal such as a laptop computer, a desktop computer, a tablet computer, or a smartphone, for example, in which the support program is installed in the storage section 12. The support program is stored in a non-transitory storage medium readable by the computing terminal, and functions by being installed in the computing terminal. The non-transitory storage medium readable by the computing terminal can be, for example, a compact disc read only memory (CD-ROM), a digital versatile disk read only memory (DVD-ROM), a universal serial bus (USB) flash drive, or the like. The PLC system construction support device 10 is an example of a PLC system construction support device.

The support device 10 and the server 300 are communicably connected via a dedicated line or a network. The dedicated line via which the connection is established may be a universal serial bus (USB) cable, for example. The network via which the connection is established may be an open network such as the Internet or a closed network such as a local area network (LAN). The support device 10 communicates with the server 300 via the communication I/F 16.

Figures 3, 4:
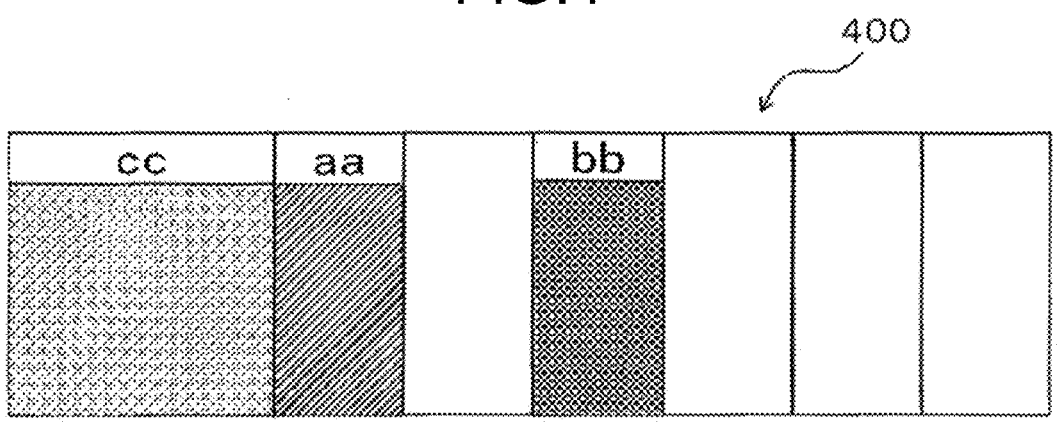
FIG. 3 is a diagram illustrating an example of unit information according to the first embodiment of the present invention.
FIG. 4 is a diagram illustrating an example of image data according to the first embodiment of the present invention.

The server 300 stores unit information 301 related to various units for constructing a PLC system. FIG. 3 illustrates an example of the unit information 301 stored in the server 300. As illustrated in FIG. 3, the unit information 301 includes unit names, unit appearance images, and unit feature images, which are stored in association with each other. Unit names are information indicating types of units such as power supply units, CPU units, and communication units, for example. Unit appearance images are exterior information, i.e. visually recognizable features of the appearance of units, such as unit color combinations, logos, and patterns, for example. Unit feature images are information unique to individual units such as model names and product numbers, for example.

In FIG. 3, unit names are indicated by AA, BB, and CC, unit appearance images are indicated by different patterns of hatching, and unit feature images are indicated by aa, bb, and cc. Note that the server 300 is an example of a storage means. Unit names, unit appearance images, and unit feature images are examples of feature information. The unit information 301 including unit names, unit appearance images, and unit feature images is an example of unit information.

Figure 2:
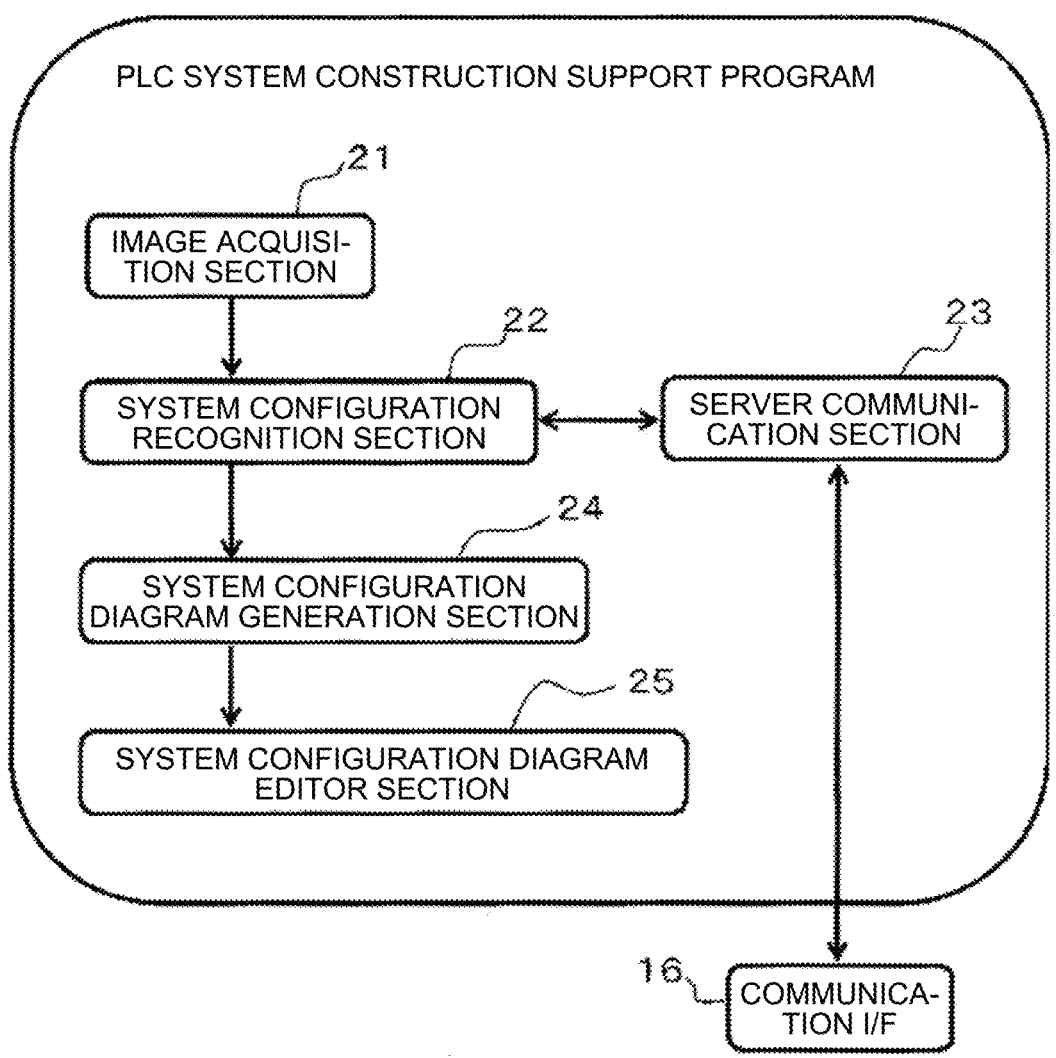
FIG. 2 is a diagram schematically illustrating functional blocks of a PLC system construction support device according to a first embodiment of the present invention.

FIG. 2 is a diagram schematically illustrating functional blocks of the support device 10 implemented by a computing terminal including the calculation section 11 and the storage section 12 illustrated in FIG. 1. The support device 10 includes an image acquisition section 21 that acquires an image of a constructed PLC system as image data, a system configuration recognition section 22 that creates arrangement information and selected unit information from the image data and creates system configuration information by associating the arrangement information with the selected unit information, a server communication section 23 that performs communication processing for communication with the server 300 via the communication I/F 16, a system configuration diagram generation section 24 that creates a system configuration diagram, and a system configuration diagram editor section 25 that generates output information for outputting the system configuration diagram to the display section 14.

The image acquisition section 21 acquires an image of the PLC system by importing an image of the PLC system captured with a camera or the like into the support device 10 as image data. The acquired image data are saved in the storage section 12. Note that the image acquisition section 21 is an example of an image acquisition section.

FIG. 4 illustrates an example of image data acquired by the image acquisition section 21. The PLC system from which the image data 400 illustrated in FIG. 4 are derived for use in the first embodiment is a PLC system in which three units are attached to a baseboard including seven slots of Nos. 0 to 6. Specifically, the units with the unit model name cc, the unit model name aa, and the unit model name bb are respectively attached to slot Nos. 0, 1, and 3 of the baseboard, and slot Nos. 2 and 4 to 6 are empty slots with no unit attached. The entire PLC system is captured, and the image data 400 are created as one piece of data. The image data 400 include: information on unit features, namely the unit model name aa, the unit model name bb, and the unit model name cc, which are information on unit model names; and information on unit exterior features such as unit color combinations, logos, and patterns. In FIG. 4, differences in information on unit appearance features are indicated by different patterns of hatching. The entire PLC system is captured, and the image data 400 are created as one piece of data. The entire PLC system refers to a configuration consisting of every unit constituting the PLC system and all empty slots, if such exist.

The system configuration recognition section 22 reads the image data 400 stored in the storage section 12, analyzes the image data 400, and creates arrangement information 500 indicating the arrangement of the units in the PLC system. For creating the arrangement information 500, the arrangement of the empty slots included in the image data 400 is also identified, and the arrangement information 500 is created including the arrangement of the empty slots that exist. In addition, information indicating features of each unit constituting the PLC system is recognized from the image data 400, the recognized information indicating features of each unit constituting the PLC system is compared with the unit information 301 stored in the server 300, and each unit included in the image data 400 is selected for creating selected unit information 600. Then, system configuration information 700 including the arrangement information 500 and the selected unit information 600 is created. The arrangement information 500, the selected unit information 600, and the system configuration information 700 created are stored in the storage section 12.

The arrangement information 500, the selected unit information 600, and the system configuration information 700 created by the system configuration recognition section 22 in the present embodiment will be described with reference to FIGS. 5 to 7.

Figure 5:
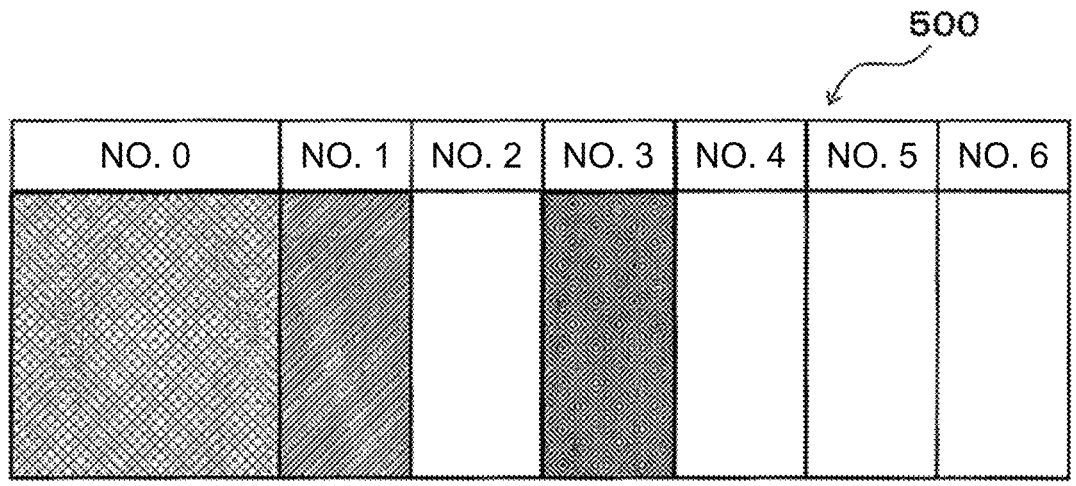
FIG. 5 is a diagram illustrating an example of arrangement information according to the first embodiment of the present invention.

FIG. 5 illustrates an example of the arrangement information 500. The arrangement information 500 illustrated in FIG. 5 for use in the first embodiment indicates the number of slots in the baseboard of the PLC system included in the image data 400, the arrangement of the slots, the number of units located in the slots, the arrangement of the units, and the number and arrangement of empty slots with no unit located. Specifically, the number of slots in the baseboard is seven, and consecutive numbers 0 to 6 are allocated as slot numbers. The number of units located is three, and the units are located in Nos. 0, 1, and 3. Further, it is shown that Nos. 2 and 4 to 6 are empty slots with no unit located. Note that the arrangement information 500 is an example of arrangement information.

Figure 6:
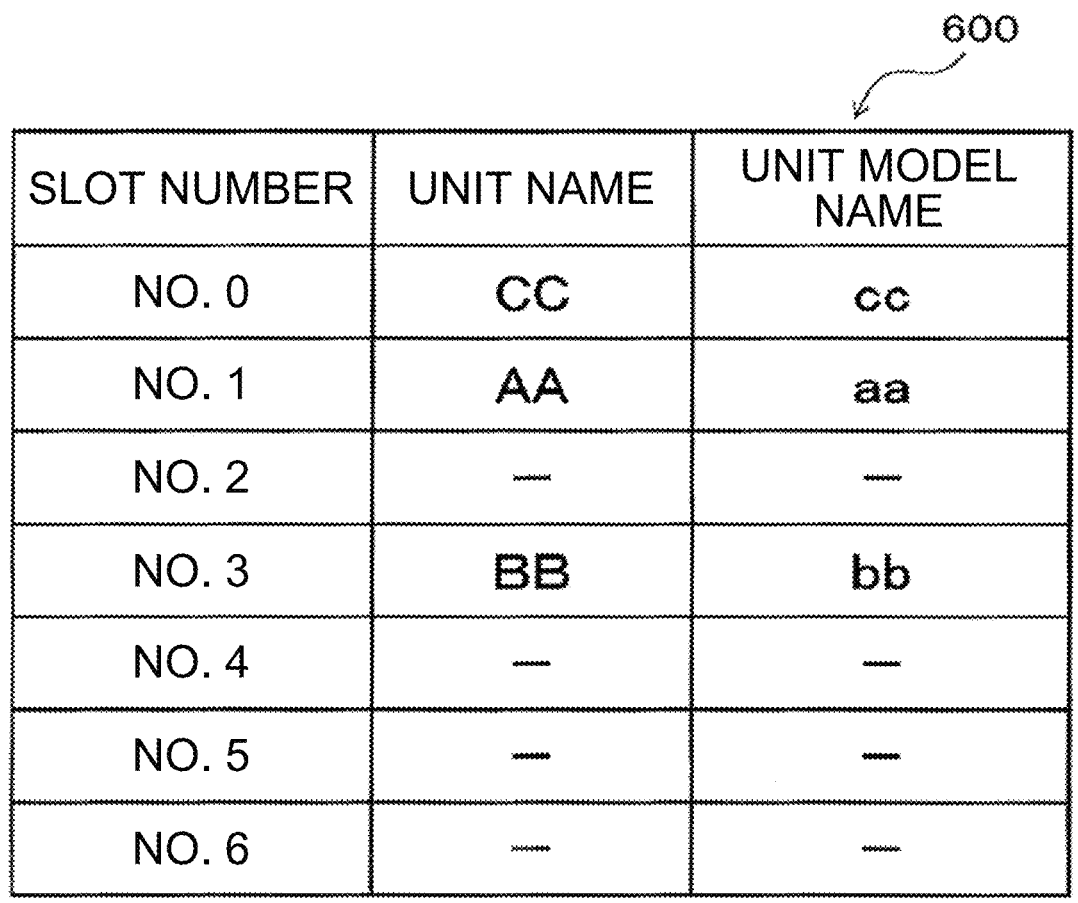
FIG. 6 is a diagram illustrating an example of selected unit information according to the first embodiment of the present invention.

FIG. 6 illustrates an example of the selected unit information 600. The selected unit information 600 illustrated in FIG. 6 for use in the present embodiment indicates the slot numbers in which the three units included in the image data 400 are located, unit names, and unit model names in association with each other. Specifically, the unit located in slot number 0 is identified as the unit name CC and the unit model name cc, and the slot number, the unit name, and the unit model name are shown in association with each other. The unit located in slot number 1 is identified as the unit name AA and the unit model name aa, and the slot number, the unit name, and the unit model name are shown in association with each other. The unit located in slot number 3 is identified as the unit name BB and the unit model name bb, and the slot number, the unit name, and the unit model name are shown in association with each other. Note that the selected unit information 600 is an example of selected unit information.

Figure 7:
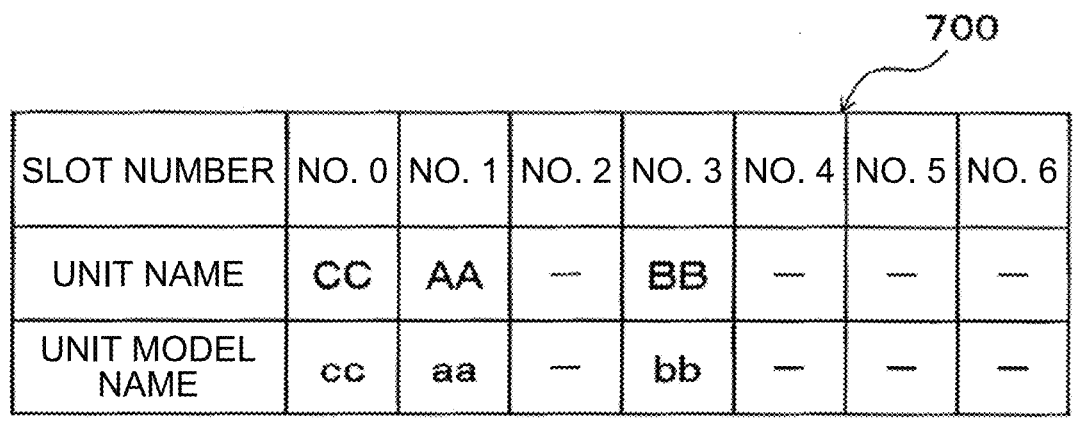
FIG. 7 is a diagram illustrating an example of system configuration information according to the first embodiment of the present invention.

FIG. 7 illustrates an example of the system configuration information 700. The system configuration information 700 for use in the present embodiment indicates the arrangement information 500 and the selected unit information 600 in association with each other. Specifically, at the position of each of the slot numbers in which the units identified by the arrangement information 500 are located, the information of the unit name and the unit model name selected in the selected unit information 600 is shown. The slot numbers identified as empty slots with no unit located are denoted by "-" indicating that no unit is located. Using the system configuration information 700, the system configuration is identified including the number of units constituting the PLC system, the arrangement of the units, information on the units (unit types, model names, and the like), the number of empty slots, and the arrangement of the empty slots. Note that the system configuration information 700 is an example of system configuration information.

Figure 8:
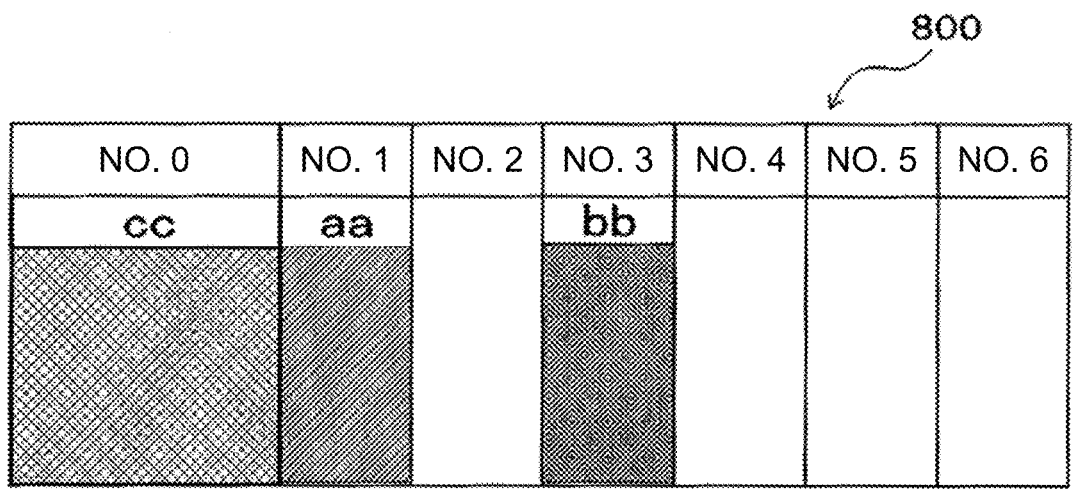
FIG. 8 is a diagram illustrating an example of a system configuration diagram according to the first embodiment of the present invention.

The system configuration diagram generation section 24 reads the system configuration information 700 saved in the storage section 12, adds object information stored in advance in the storage section 12 to the system configuration identified by the system configuration information 700, and creates a system configuration diagram 800 illustrated in FIG. 8. Object information is graphics that schematically represent different types of units for distinguishing the units. Specifically, if the unit name BB identified by the system configuration information 700 is a CPU unit, object information representing a CPU unit is added to the position of slot number 1. In addition, object information representing an empty slot is added to the position of a slot number identified as an empty slot. The system configuration diagram 800 illustrated in FIG. 8 is created by assigning the positions of all the slot numbers identified by the system configuration information 700 corresponding items of object information.

The system configuration diagram editor section 25 performs display processing for displaying the system configuration diagram 800 created by the system configuration diagram generation section 24 on the display section 14. Specifically, information of the system configuration diagram 800 is converted into a signal receivable by the display section 14, which is then output to the display section 14. Note that the display section 14 may be a display provided in the support device 10 or a display connected to the support device 10.

Figure 9:
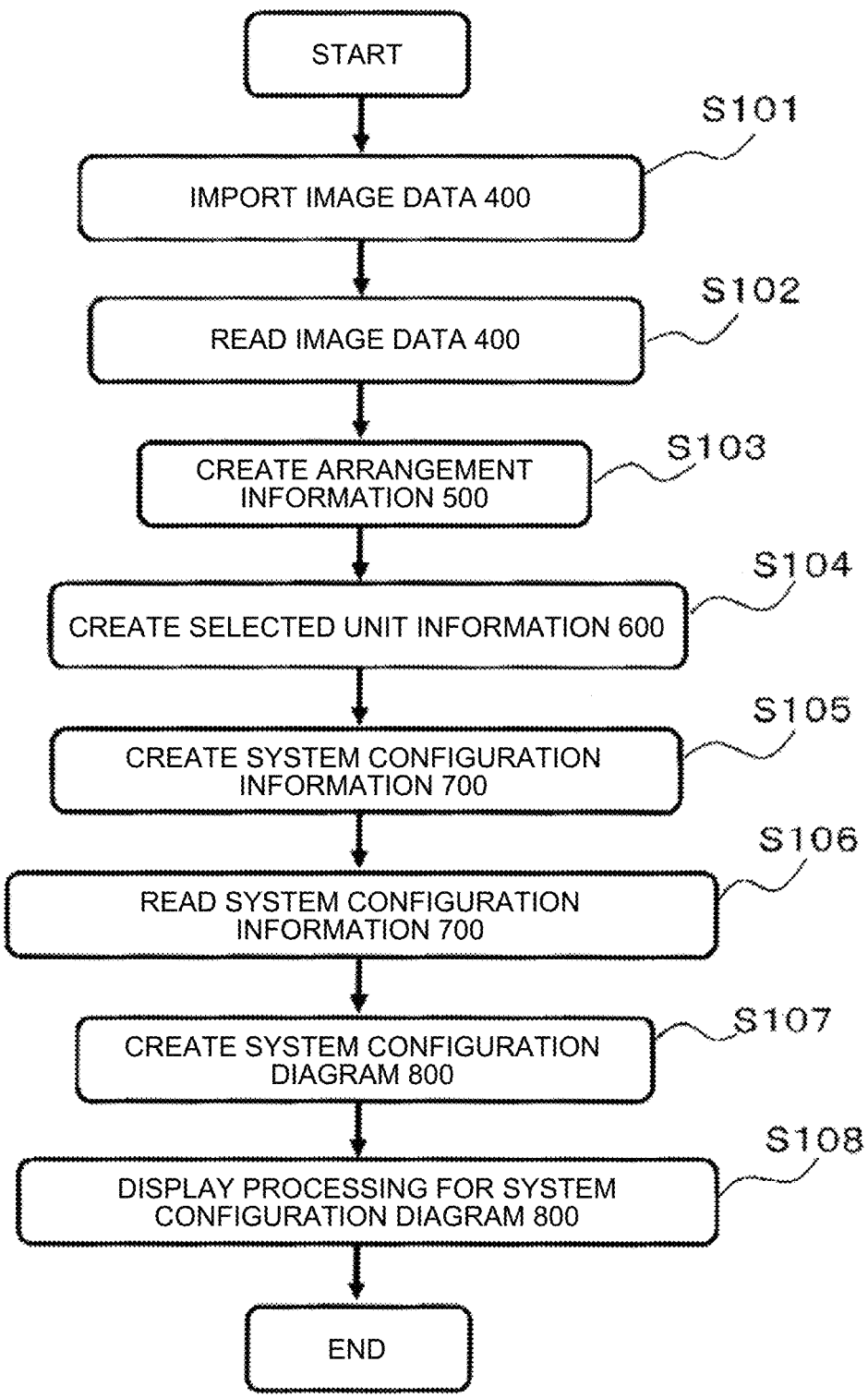
FIG. 9 is a flowchart illustrating the operation of the PLC system construction support device according to the first embodiment of the present invention.

FIG. 9 is a flowchart illustrating the operation of the support program and the support device 10 according to the first embodiment. Hereinafter, the operation of the support program and the support device 10 according to the first embodiment will be described with reference to FIG. 9. Note that activating the support program installed in the support device 10 makes the support device 10 ready to start the operation.

The user captures an image of an already constructed PLC system using an imaging medium such as a camera. The captured image should include the entire PLC system. The captured image is imported as image data into the support device 10 by the image acquisition section 21 (step S101). Specifically, the imaging medium and the support system 10 are connected through wireless or wired means, and the image saved in the imaging medium is stored in the storage section 12 as the image data 400.

Next, the system configuration recognition section 22 retrieves the image data 400 stored in the storage section 12 (step S102). Upon reading the image data 400, the system configuration recognition section 22 creates the arrangement information 500 based on the image data 400 (step S103). Subsequently, information indicating features of each unit constituting the PLC system is recognized from the image data 400, the recognized information indicating features of each unit constituting the PLC system is compared with the unit information 301 stored in the server 300, and the selected unit information 600 is created (step S104). Subsequently, the arrangement information 500 and the selected unit information 600 are associated with each other so that the system configuration information 700 is created (step S105). Hereinafter, a procedure for creating the arrangement information 500, the selected unit information 600, and the system configuration information 700 will be described in detail.

In step S103, the system configuration recognition section 22 analyzes the read image data 400 and creates the arrangement information 500 indicating the arrangement of the units in the PLC system. Specifically, the number of units included in the image data 400 is identified based on unit color combinations, unit sizes, and the like. Next, connectors included in the image data 400 are identified based on colors, shapes, and the like. Here, a connector refers to a connector for connecting a unit provided on the baseboard. Then, the identified units and connectors are arranged according to the image data 400. Here, one connector is replaced with one empty slot, and the arranged units and empty slots are numbered. Consequently, the arrangement information 500 illustrated in FIG. 5 is created.

In step S104, the system configuration recognition section 22 recognizes information indicating features of each unit constituting the PLC system from the image data 400, and compares the recognized information indicating features of each unit constituting the PLC system with the unit information 301 stored in the server 300, thereby selecting the units included in the image data 400 to create the selected unit information 600. Specifically, the image data 400 are analyzed, and information on appearance features of the units is extracted from the image data 400. Here, appearance features are comparative information for comparison with the unit appearance images and unit feature images included in the unit information 301 stored in the server 300. That is, appearance features are visually recognizable exterior features of the appearance of units such as unit color combinations, logos, and patterns, and features unique to individual units such as model names and product numbers. Note that information on appearance features is an example of information indicating features of the units recognized from the image data 400.

The system configuration recognition section 22 transmits the extracted information on appearance features to the server communication section 23. The information on appearance features is subjected to communication processing by the server communication section 23, and transmitted to the server 300 via the communication I/F 15. The system configuration recognition section 22 compares the transmitted appearance features with the unit appearance images and unit feature images included in the unit information 301, and extracts the items of unit information 301 corresponding to the information on appearance features. The extracted unit information 301 is transmitted from the server 300 to the support device 10. The unit information 301 transmitted from the server 300 is received via the communication I/F 16 and stored in the storage section 12. This operation is repeated for the number of units identified by the above-mentioned arrangement information 500, and the slot numbers are associated with the unit information 301, whereby the selected unit information 600 illustrated in FIG. 6 is created. Note that the slot numbers of the empty slots identified by the arrangement information 500 are assigned "-" indicating "no unit".

In step S105, the arrangement information 500 and the selected unit information 600 described above are associated with each other, whereby the system configuration is identified including the number of units constituting the PLC system included in the image data 400, the arrangement of the units, information on the units (unit types, model names, and the like), the number of empty slots, and the arrangement of the empty slots, and the system configuration information 700 illustrated in FIG. 7 is created. The created system configuration information 700 is stored in the storage section 12.

Next, the system configuration diagram generation section 24 retrieves the system configuration information 700 stored in the storage section 12 (step S106). Upon reading the system configuration information 700, the system configuration diagram generation section 24 adds object information stored in advance in the storage section 12 to the system configuration identified by the system configuration information 700, and creates the system configuration diagram 800 (step S107).

Specifically, in step S107, object information indicating a unit is added in accordance with the unit name of each unit identified, and object information indicating an empty slot is added for each empty slot, whereby the system configuration diagram 800 is created. Information of the created system configuration diagram is stored in the storage section 12.

Finally, the system configuration diagram editor section 25 reads the information of the system configuration diagram 800 stored in the storage section 12, performs display processing for displaying the system configuration diagram on the display section 14, and displays the system configuration diagram 800 on the display section 14 (step S108).

Specifically, in step S108, through the display processing of the system configuration diagram editor section 25, the system configuration diagram 800 is displayed on the display section 14, showing that the unit with the unit name CC is located in slot number 0, the unit with the unit name AA is located in slot number 1, and the unit with the unit name BB is located in slot number 3, as illustrated in FIG. 8. In addition, it is shown that slot numbers 2 and 4 to 6 are empty slots. After the completion of step S108, the operation of the support device 10 and the support program is completed.

As described above, the support device 10 and the support program according to the first embodiment include: the image acquisition section 21 that acquires the image data 400 of an image of the PLC system; the system configuration recognition section 22 that creates the arrangement information 500 indicating the arrangement of the units from the acquired image data 400, creates the selected unit information 600 by selecting each of the units included in the image data 400, and creates the system configuration information 700 in which the arrangement information 500 and the selected unit information 600 are associated with each other; and the system configuration diagram generation section 24 that creates a system configuration diagram based on the created system configuration information 700. Consequently, the use of the image data 400, the arrangement information 500, the selected unit information 600, and the system configuration information 700 makes it possible to create a system configuration diagram for a PLC system actually constructed while reducing or preventing the selection of a wrong unit due to their false recognition by the user, avoiding the influence of environmental factors such as the preparation of a communication environment, and reducing or preventing lack of unit information.

Second Embodiment

A PLC system construction support program and a PLC system construction support device according to the second embodiment of the present invention will be described with reference to the drawings. Note that components similar to those of the first embodiment are denoted by the same reference signs, and a detailed description thereof is omitted. Hereinafter, differences from the first embodiment will be described in detail.

Figure 10:
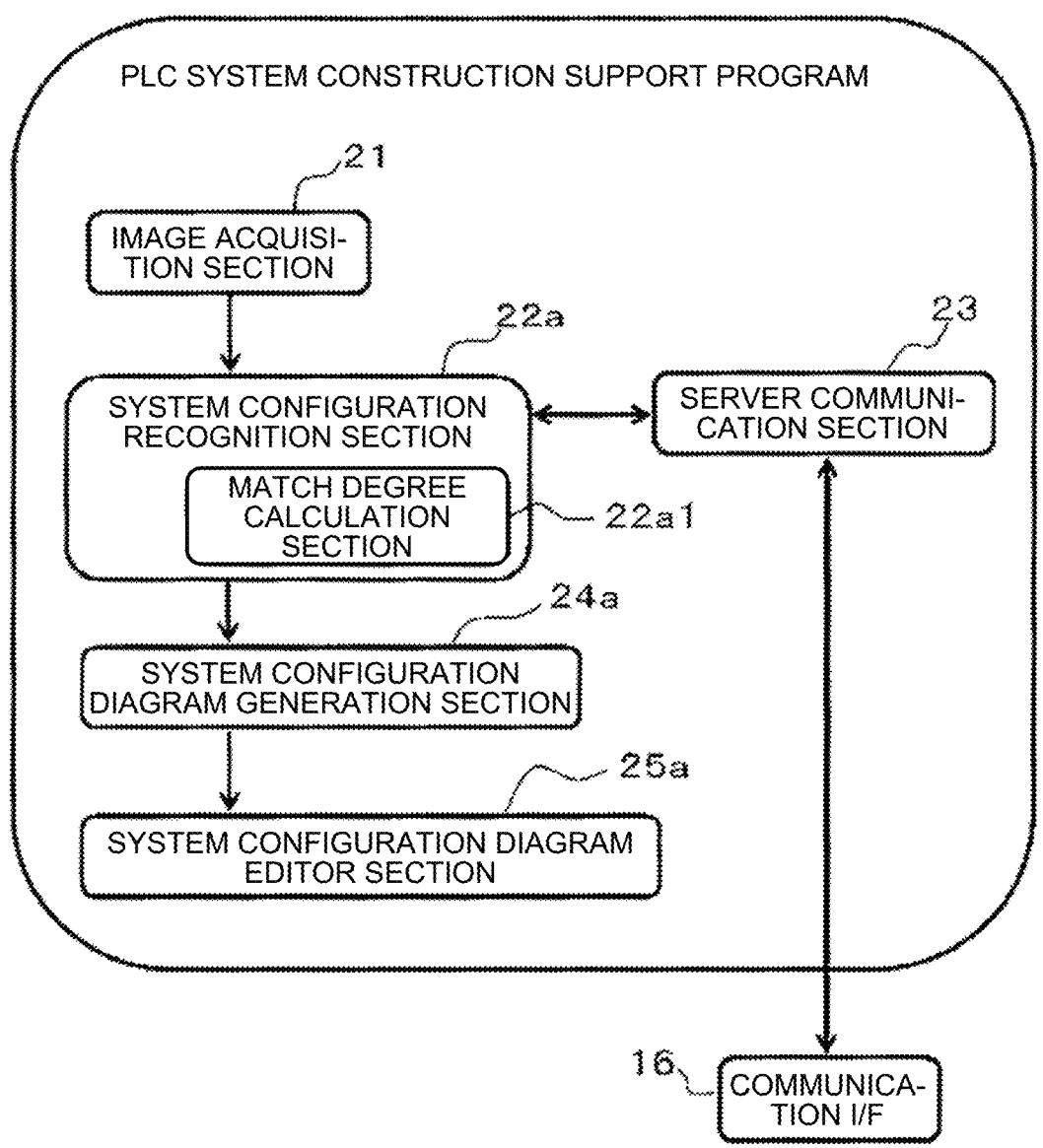
FIG. 10 is a diagram schematically illustrating functional blocks of a PLC system construction support device according to a second embodiment of the present invention.

FIG. 10 is a diagram schematically illustrating functional blocks of a support device 10a. The support device 10a creates a system configuration diagram using a PLC system including units different from those of the PLC system used in the first embodiment.

As illustrated in FIG. 10, the support device 10a according to the second embodiment includes a system configuration recognition section 22a, a system configuration diagram generation section 24a, and a system configuration diagram editor section 25a different from the system configuration recognition section 22, the system configuration diagram generation section 24, and the system configuration diagram editor section 25 described in the first embodiment. In addition, the server 300 stores unit information 301a different from the unit information 301 described in the first embodiment.

As illustrated in FIG. 11, the unit information 301a stored in the server 300 includes unit names, unit appearance images, unit feature images, and unit dimensions, which are stored in association with each other. Unit names, unit appearance images, and unit feature images are similar to those in the first embodiment, and thus the description thereof is omitted. Unit dimensions are information indicating the vertical and horizontal sizes of units.

In FIG. 11, unit names are indicated by AA to EE, unit appearance images are indicated by different patterns of hatching, and unit feature images are indicated by aa to cc. In the illustrated example, the unit information 301a does not contain any unit feature images corresponding to the unit names DD and EE. Unit dimensions indicate the vertical and horizontal dimensions corresponding to the unit names AA to EE. The unit of the dimensions is "millimeter (mm)". Note that the server 300 is an example of a storage means. Unit names, unit appearance images, unit feature images, and unit dimensions are examples of feature information. The unit information 301a including unit names, unit appearance images, unit feature images, and unit dimensions is an example of unit information.

Figure 12:
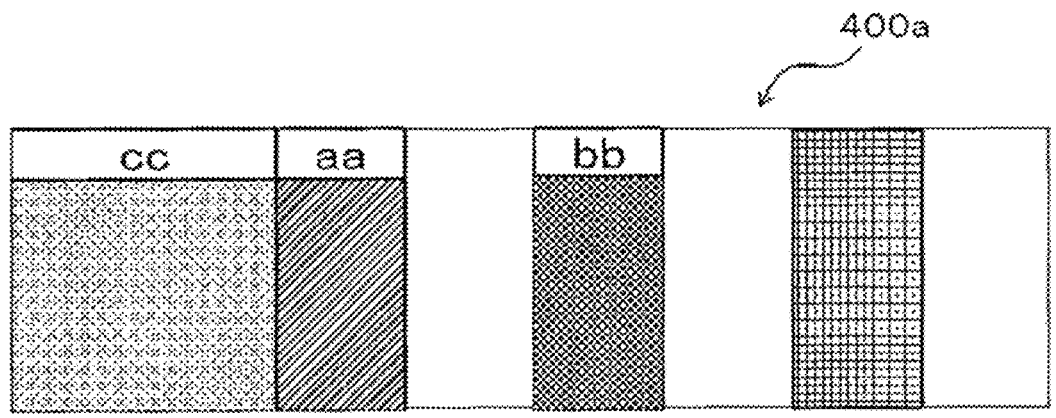
FIG. 12 is a diagram illustrating an example of image data according to the second embodiment of the present invention.

FIG. 12 illustrates an example of image data for use in the second embodiment. The PLC system from which the image data 400a illustrated in FIG. 12 are derived for use in the second embodiment is a PLC system in which four units are attached to a baseboard including seven slots of Nos. 0 to 6. Specifically, on the baseboard, the unit with the unit model name cc is attached to slot No. 0, the unit with the unit model name aa is attached to slot No. 1, and the unit with the unit model name bb is attached to slot No. 3. A unit whose unit model name is unknown is attached to slot No. 5. Slot Nos. 2, 4, and 6 are empty slots with no unit attached. The entire PLC system is captured, and the image data 400a are created as one piece of data. The entire PLC system refers to a configuration consisting of every unit constituting the PLC system and all empty slots, if such exist.

The image data 400a include: information on features unique to individual units, namely the unit model name aa, the unit model name bb, and the unit model name cc, which are information on known unit model names; information on unit exterior features such as unit color combinations, logos, and patterns; and information on unit dimensions, which are the vertical and horizontal dimensions of units. In FIG. 12, differences in information on unit exterior features are indicated by different patterns of hatching. The image data 400a are stored in the storage section 12 as in the first embodiment.

Figure 13:
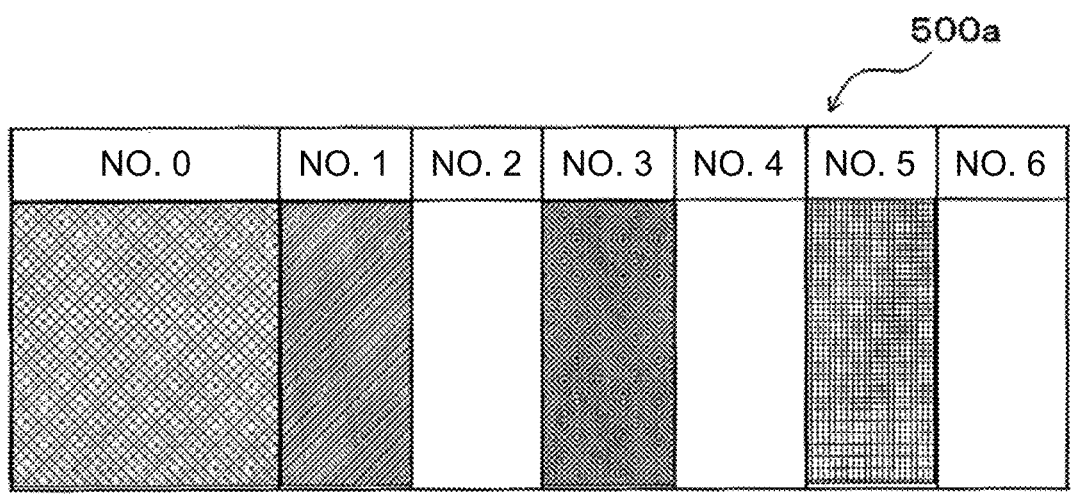
FIG. 13 is a diagram illustrating an example of arrangement information according to the second embodiment of the present invention.

The system configuration recognition section 22a reads the image data 400a stored in the storage section 12, analyzes the image data 400a, and creates arrangement information 500a indicating the arrangement of the units in the PLC system as illustrated in FIG. 13. For creating the arrangement information 500a, the arrangement of the empty slots is also identified as in the first embodiment, and the arrangement information 500a is created including the arrangement of the empty slots that exist. In addition, information indicating features of each unit constituting the PLC system is recognized from the image data 400a, the recognized information indicating features of each unit constituting the PLC system is compared with the unit information 301a stored in the server 300, and the units included in the image data 400a are selected for creating selected unit information 600a illustrated in FIG. 14.

The system configuration recognition section 22a includes a match degree calculation section 22a1 for calculating match degrees indicating match rates for the units included in the image data 400a when creating the selected unit information 600a. The selected unit information 600a is created by associating the slot numbers in which the units are located with corresponding unit match degrees. Then, system configuration information 700a illustrated in FIG. 15 is created including the arrangement information 500a and the selected unit information 600a. Details of the selected unit information 600a and the system configuration information 700a in the second embodiment will be described later. The arrangement information 500a, the selected unit information 600a, and the system configuration information 700a created are saved in the storage section 12.

Figure 16:
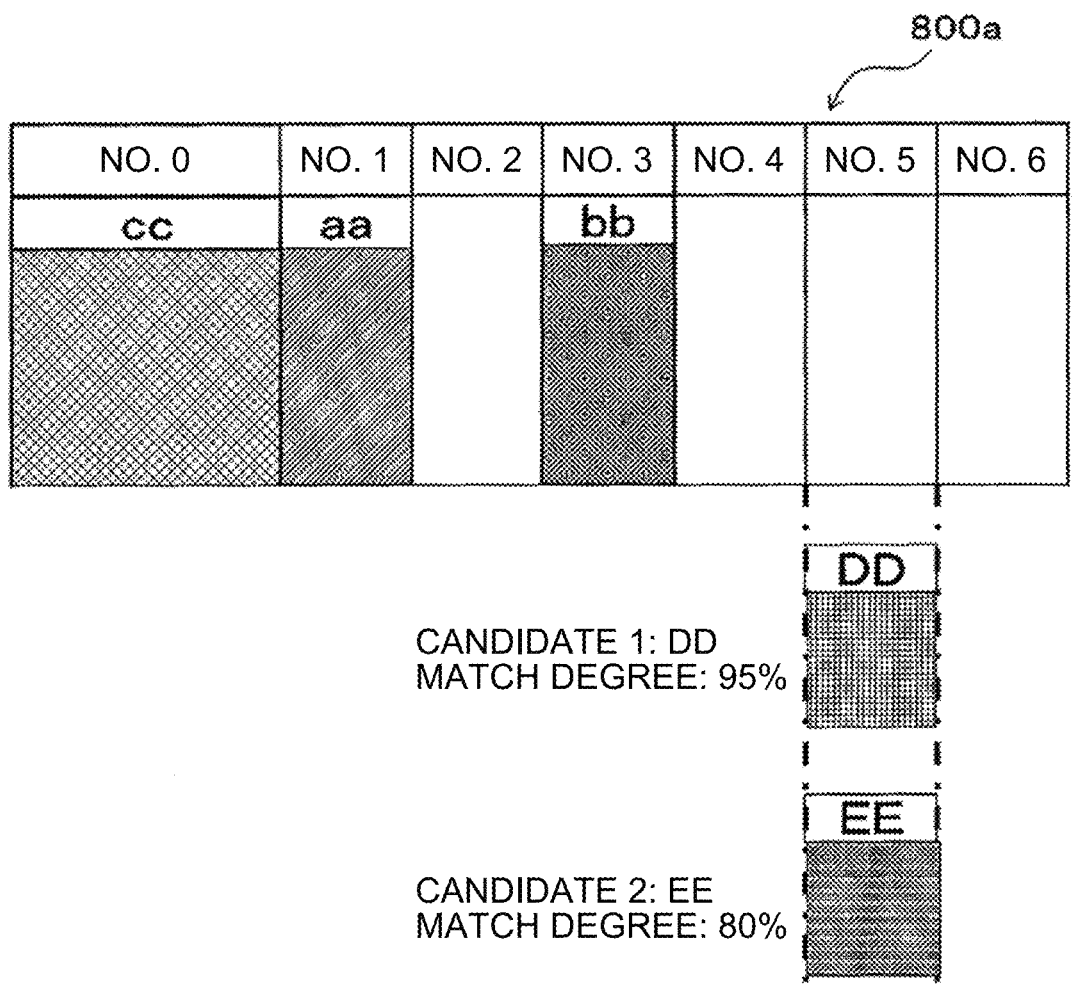
FIG. 16 is a diagram illustrating an example of a system configuration diagram according to the second embodiment of the present invention.

The system configuration diagram generation section 24a reads the system configuration information 700a saved in the storage section 12, adds object information stored in advance in the storage section 12 to the system configuration included in the system configuration information 700a, and creates a system configuration diagram 800a illustrated in FIG. 16. In addition, object information representing an empty slot is added to the position of a slot number identified as an empty slot. The system configuration diagram 800a is created by assigning the positions of all the slot numbers identified by the system configuration information 700a corresponding items of object information. Details of the system configuration diagram 800a in the second embodiment will be described later.

The system configuration diagram editor section 25a performs display processing for displaying the system configuration diagram 800a created by the system configuration diagram generation section 24a on the display section 14. Specifically, information of the system configuration diagram 800a is converted into a signal receivable by the display section 14, which is then output to the display section 14.

Figure 17:
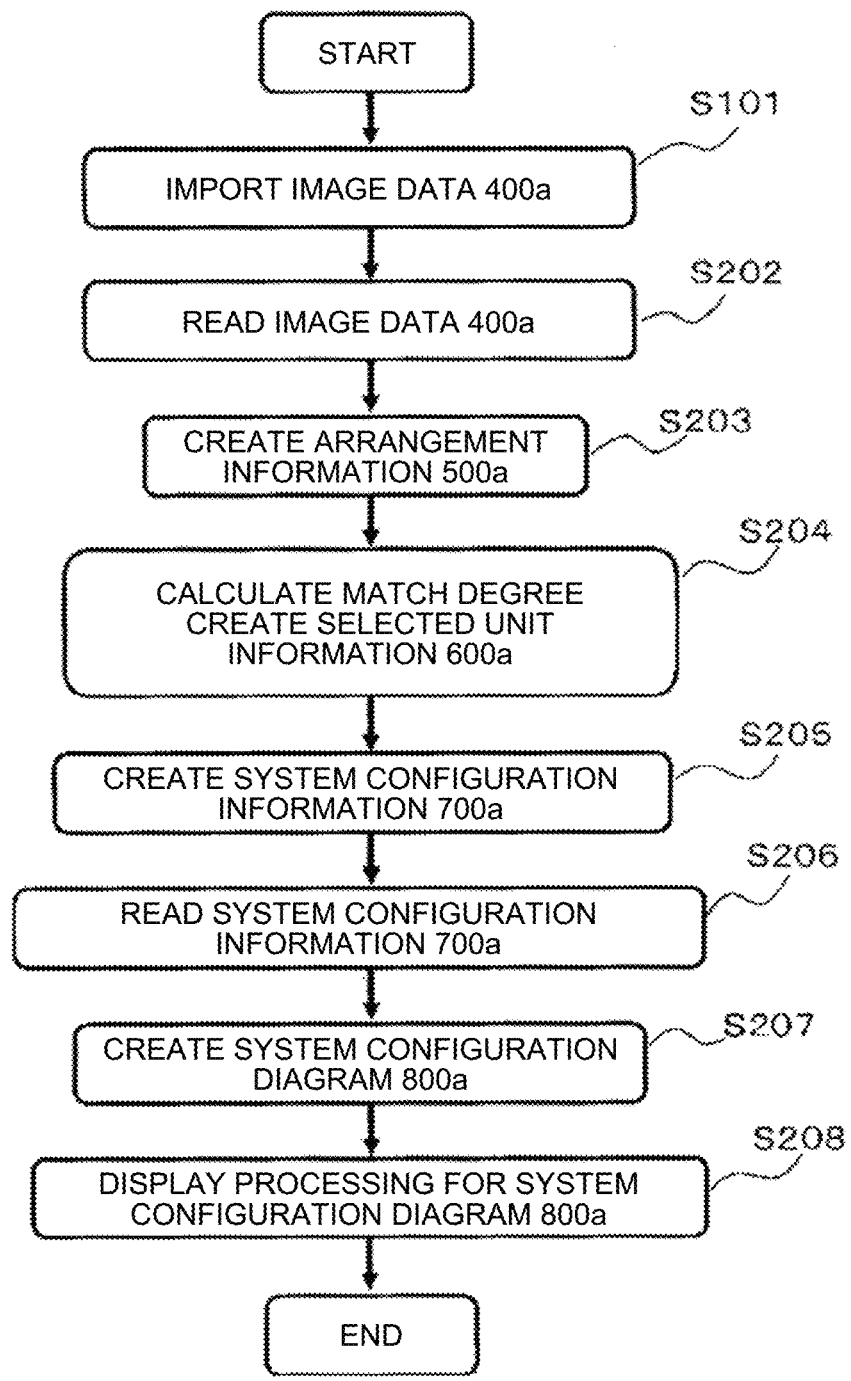
FIG. 17 is a flowchart illustrating the operation of the PLC system construction support device according to the second embodiment of the present invention.

FIG. 17 is a flowchart illustrating the operation of the support program and the support device 10a according to the second embodiment. Hereinafter, the operation of the support program and the support device 10a according to the second embodiment will be described with reference to FIG. 17. Note that activating the support program installed in the support device 10a makes the support device 10a ready to start the operation. Note that steps similar to those of the first embodiment are denoted by the same reference signs, and a detailed description thereof is omitted.

The image data 400a are imported in step S101 in the same manner as in the first embodiment, and the system configuration recognition section 22a retrieves the image data 400a stored in the storage section 12 (step S202). Upon reading the image data 400a, the system configuration recognition section 22a creates the arrangement information 500a based on the image data 400a (step S203). Subsequently, information indicating features of each unit constituting the PLC system is recognized from the image data 400a, the recognized information indicating features of each unit constituting the PLC system is compared with the unit information 301a stored in the server 300, and the selected unit information 600a is created (step S204). Subsequently, the arrangement information 500a and the selected unit information 600a are associated with each other so that the system configuration information 700a is created (step S205).

In step S203, the units and empty slots included in the image data 400a are identified in the same manner as in the first embodiment. Consequently, the arrangement information 500a illustrated in FIG. 13 is created. Regarding the arrangement information 500a illustrated in FIG. 13, the number of slots in the baseboard is seven, and consecutive numbers 0 to 6 are allocated as slot numbers. The number of units located is four, and the units are located in Nos. 0, 1, 3, and 5. Further, it is shown that Nos. 2, 4, and 6 are empty slots with no unit located. Note that the arrangement information 500a is an example of arrangement information.

In step S204, the system configuration recognition section 22a recognizes information indicating features of each unit constituting the PLC system from the image data 400a, and compares the recognized information indicating features of each unit constituting the PLC system with the unit information 301a stored in the server 300, thereby creating the selected unit information 600a. Specifically, the image data 400a are analyzed, and information on appearance features of the units is extracted from the image data 400a. Here, appearance features are comparative information for comparison with the unit appearance images, unit feature images, and unit dimensions included in the unit information 301a stored in the server 300. That is, appearance features are visually recognizable features of the appearance of units such as unit color combinations, logos, and patterns, features unique to individual units such as model names and product numbers, and features of the vertical and horizontal dimensions of units. Note that information on appearance features is an example of information indicating features of the units recognized from the image data 400a.

The system configuration recognition section 22a transmits the extracted information on appearance features to the server communication section 23. The information on appearance features is subjected to communication processing by the server communication section 23, and transmitted to the server 300 via the communication I/F 16. The system configuration recognition section 22a compares the transmitted appearance features with the unit appearance images, unit feature images, and unit dimensions included in the unit information 301a, and extracts the items of unit information 301a corresponding to the information on appearance features.

In the second embodiment, for the units located in slot numbers 0, 1, and 3 included in the image data 400a, it is possible to transmit appearance features including all items of comparative information: unit exterior features, features unique to individual units, and unit dimensions, and thus, the items of unit information 301a corresponding to each unit are selected and extracted. However, the unit located in slot number 5 included in the image data 400a has no feature information unique to the unit. Therefore, for the unit located in slot number 5, visually recognizable exterior features of the appearance of the unit such as the unit color combination, logo, and pattern, and unit dimensions, i.e. features of the vertical and horizontal dimensions of the unit, are transmitted to the server 300 as appearance features. Then, the system configuration recognition section 22a compares the appearance features with the unit appearance images and unit dimensions included in the unit information 301a.

Specifically, the exterior features are compared with the unit appearance images, the unit information 301a including unit appearance images similar to the exterior features is selected, and the unit dimensions included in the selected unit information 301a are compared with the unit dimensions included in the appearance features. The unit information 301a obtained as the result of the comparison of unit dimensions is extracted as candidates for the unit located in slot number 5. Here, the unit information 301a concerning the unit name DD and the unit name EE illustrated in FIG. 11 is extracted as candidates for the unit located in No. 5.

The extracted unit information 301a is transmitted to the support device 10a. The unit information 301a transmitted from the server 300 is received by the support device 10a via the communication I/F 16 and stored in the storage section 12. The system configuration recognition section 22a reads the unit information 301a stored in the storage section 12, and calculates match degrees for the units located in slot numbers 0, 1, 3, and 5 based on the exterior information by means of the match degree calculation section 22a1. The calculation of match degrees can be performed by using a known statistical operation. The system configuration recognition section 22a associates the calculated match degrees with corresponding slot numbers, unit names, and unit model names to create the selected unit information 600a illustrated in FIG. 14. Note that the slot numbers of the empty slots identified by the arrangement information 500a are assigned "-" indicating "no unit".

In step S205, the arrangement information 500a and the selected unit information 600a described above are associated with each other, whereby the system configuration is generated including the number of units constituting the PLC system included in the image data 400a, the arrangement of the units, information on the units (unit types, model names, match degrees, and the like), the number of empty slots, and the arrangement of the empty slots, and the system configuration information 700a illustrated in FIG. 15 is created. Here, information of the selected unit information 600a indicates that there are a plurality of candidate units for the unit in slot number 5; therefore, the system configuration information 700a is created accordingly. The created system configuration information 700a is stored in the storage section 12.

Next, the system configuration diagram generation section 24a retrieves the system configuration information 700a stored in the storage section 12 (step S206). Upon reading the system configuration information 700, the system configuration diagram generation section 24a adds object information stored in advance in the storage section 12 to the system configuration indicated by the system configuration information 700a, and creates the system configuration diagram 800a (step S207).

Specifically, in step S207, based on the system configuration information 700a, object information indicating a unit is added in accordance with the unit name of each unit, and object information indicating an empty slot is added for each empty slot, whereby the system configuration diagram 800a is created. Here, because the unit in slot number 5 has a plurality of candidates, the plurality of candidates are assigned items of object information corresponding to the respective unit names. Information of the created system configuration diagram is stored in the storage section 12.

Finally, the system configuration diagram editor section 25a reads the information of the system configuration diagram stored in the storage section 12, performs display processing for displaying the system configuration diagram 800a on the display section 14, and displays the system configuration diagram 800a on the display section 14 (step S208).

Specifically, in step S208, through the display processing of the system configuration diagram editor section 25a, the system configuration diagram 800a is displayed on the display section 14, showing that the unit with the unit name CC is located in slot number 0, the unit with the unit name AA is located in slot number 1, and the unit with the unit name BB is located in slot number 3, as illustrated in FIG. 16.

Here, in the second embodiment, because the system configuration information 700a includes information indicating the presence of a plurality of candidate units for the unit located in slot number 5, the system configuration diagram 800a created based on the system configuration information 700a also includes information on the plurality of candidate units. Thus, as there is a possibility that the unit with the unit name DD or the unit name EE may be located in slot number 5, the items of object information and unit names corresponding to the two units are shown in association with the match degrees of the respective units, and the system configuration diagram 800a is displayed on the display section 14 such that the units are selectable by the user. In addition, it is shown that slot numbers 2, 4, and 6 are empty slots. After the completion of step S208, the operation of the support device 10 and the support program is completed.

As described above, the support device 10a and the support program according to the second embodiment also use the image data 400a, the arrangement information 500a, the selected unit information 600a, and the system configuration information 700a, which makes it possible to create a system configuration diagram for a PLC system actually constructed while reducing or preventing selection of a wrong unit due to their false recognition by the user, avoiding the influence of environmental factors such as the preparation of a communication environment, and preventing lack of unit information.

In addition, the system configuration recognition section 22a includes the match degree calculation section 22a1 so that match degree information can be added to the system configuration information 700a. Therefore, even though there may be some missing information in the image data 400a, it is possible to display candidates for the units constituting the PLC system, and prevent lack of unit information more effectively.

Third Embodiment

A PLC system construction support program and a PLC system construction support device according to the third embodiment of the present invention will be described with reference to the drawings. Note that components similar to those of the first embodiment are denoted by the same reference signs, and a detailed description thereof is omitted. Hereinafter, differences from the first embodiment will be mainly described.

Figure 18:
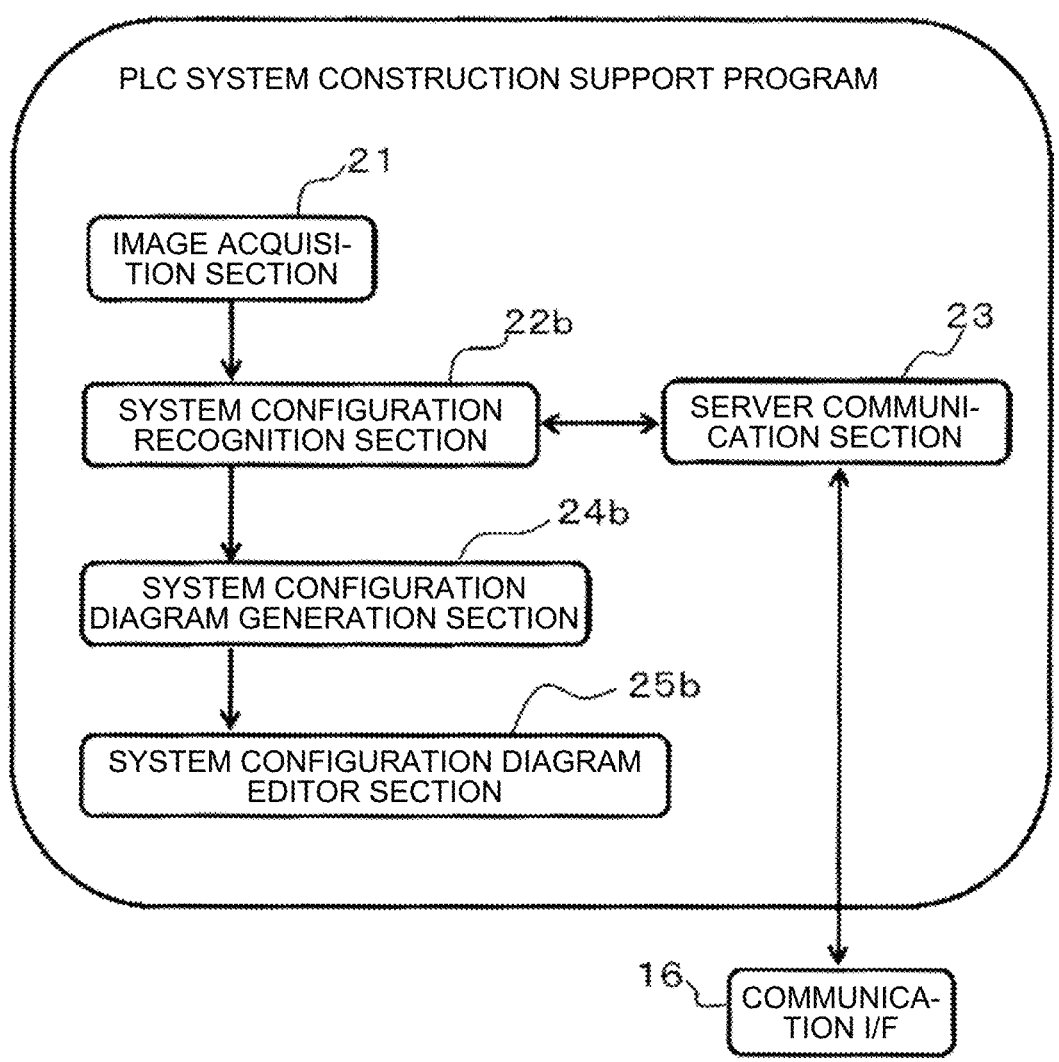
FIG. 18 is a diagram schematically illustrating functional blocks of a PLC system construction support device according to a third embodiment of the present invention.

FIG. 18 is a diagram schematically illustrating functional blocks of a support device 10b. The support device 10b according to the third embodiment includes a system configuration recognition section 22b, a system configuration diagram generation section 24b, and a system configuration diagram editor section 25b different from the system configuration recognition section 22, the system configuration diagram generation section 24, and the system configuration diagram editor section 25 described in the first embodiment. In addition, the server 300 stores unit information 301b different from the unit information 301 described in the first embodiment.

As illustrated in FIG. 19, the unit information 301b stored in the server 300 includes unit names, unit appearance images, unit feature images, unit dimensions, substitute units, production information, and unit prices, which are stored in association with each other. Unit names, unit appearance images, and unit feature images are similar to those in the first embodiment, and thus the description thereof is omitted. Unit dimensions are information indicating the vertical and horizontal sizes of units. Substitute units are information indicating substitutable units of the same type. Production information is production status information indicating whether units are in production, have gone out of production, or are scheduled to go out of production. Unit prices are information on the sales price of units.

In FIG. 19, unit names are indicated by AA, BB, CC, AA-A, AA-A1, and BB-B, unit appearance images are indicated by different patterns of hatching, and unit feature images are indicated by aa, bb, cc, aa-a, aa-a1, and bb-b. Here, in the unit information 301b, the unit appearance images representing the unit with the unit name AA and the units with the unit names AA-A and AA-A1 are indicated by similar hatching patterns, and the appearance images representing the unit with the unit name BB and the unit with the unit name BB-B are indicated by similar hatching patterns. This is because the unit with the unit name AA, the unit with the unit name AA-A, and the unit with the unit name AA-A1 are substitutable units of the same type. The unit with the unit name BB and the unit with the unit name BB-B have a similar relationship. Unit dimensions indicate the vertical and horizontal dimensions corresponding to each unit. The unit of the dimensions is "millimeter (mm)". Note that the server 300 is an example of a storage means, unit names, unit appearance images, unit feature images, unit dimensions, substitute units, production information, and unit prices are examples of feature information, and the unit information 301b including unit names, unit appearance images, unit feature images, unit dimensions, substitute units, production information, and unit prices is an example of unit information.

The image data for use in the third embodiment are similar to the image data 400 described in the first embodiment.

The system configuration recognition section 22b reads the image data 400 stored in the storage section 12, analyzes the image data 400, and creates the arrangement information 500 indicating the arrangement of the units in the PLC system as in the first embodiment. In addition, information indicating features of each unit constituting the PLC system is recognized from the image data 400, the recognized information indicating features of each unit constituting the PLC system is compared with the unit information 301b stored in the server 300, and the units included in the image data 400 are selected for creating selected unit information 600b illustrated in FIG. 20. Then, system configuration information 700b illustrated in FIG. 21 is created including the arrangement information 500 and the selected unit information 600b. Details of the selected unit information 600b and the system configuration information 700b in the third embodiment will be described later. The arrangement information 500, the selected unit information 600b, and the system configuration information 700b created are saved in the storage section 12.

Figure 22:
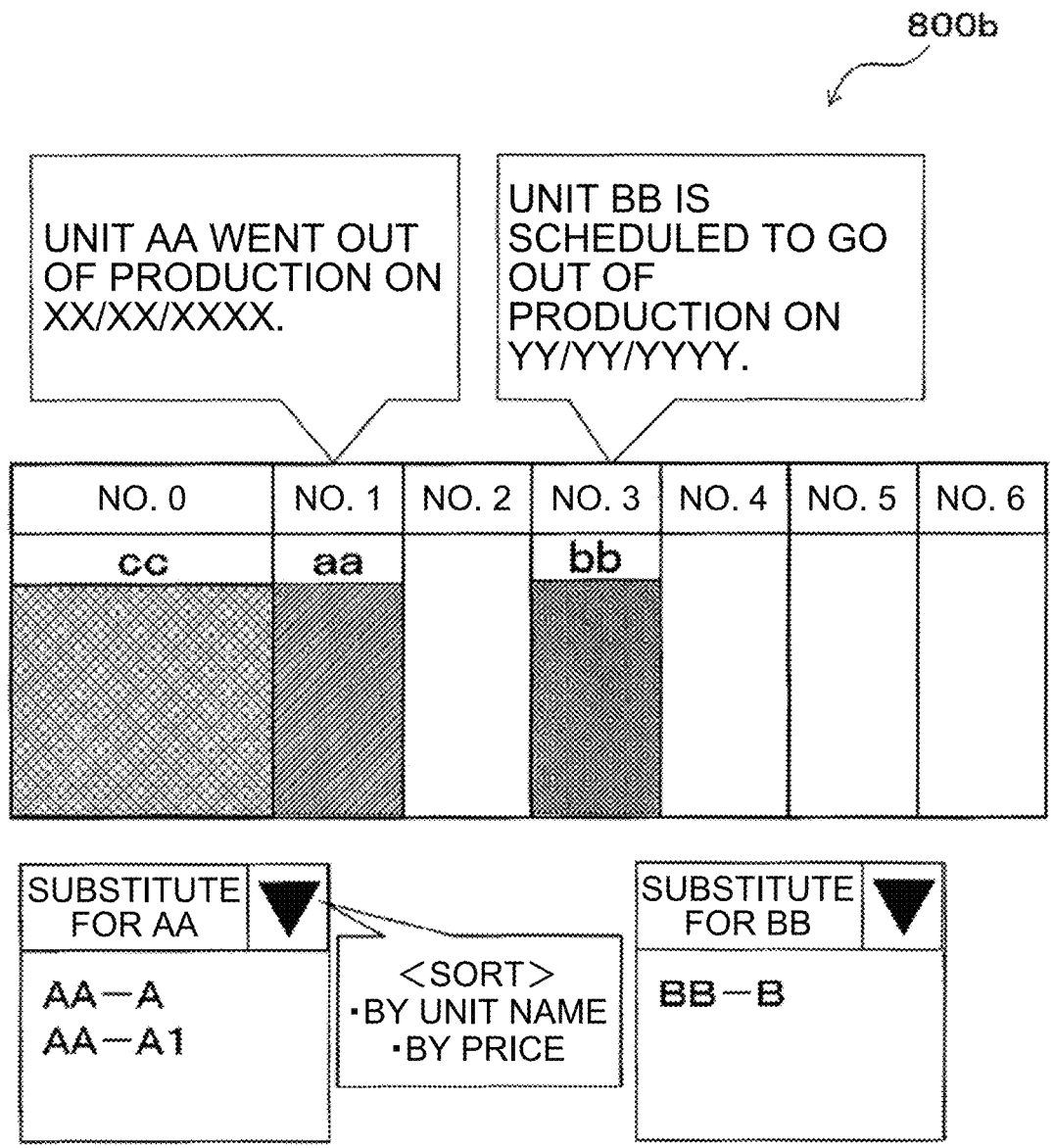
FIG. 22 is a diagram illustrating an example of a system configuration diagram according to the third embodiment of the present invention.

The system configuration diagram generation section 24b reads the system configuration information 700b saved in the storage section 12, adds object information stored in advance in the storage section 12 to the system configuration included in the system configuration information 700b, and creates a system configuration diagram 800b illustrated in FIG. 22. In addition, object information representing an empty slot is added to the position of a slot number identified as an empty slot. The system configuration diagram 800b is created by assigning the positions of all the slot numbers identified by the system configuration information 700b corresponding items of object information. Details of the system configuration diagram 800b in the third embodiment will be described later.

The system configuration diagram editor section 25b performs display processing for displaying the system configuration diagram 800b created by the system configuration diagram generation section 24b on the display section 14. Specifically, information of the system configuration diagram 800b is converted into a signal receivable by the display section 14, which is then output to the display section 14.

Figure 23:
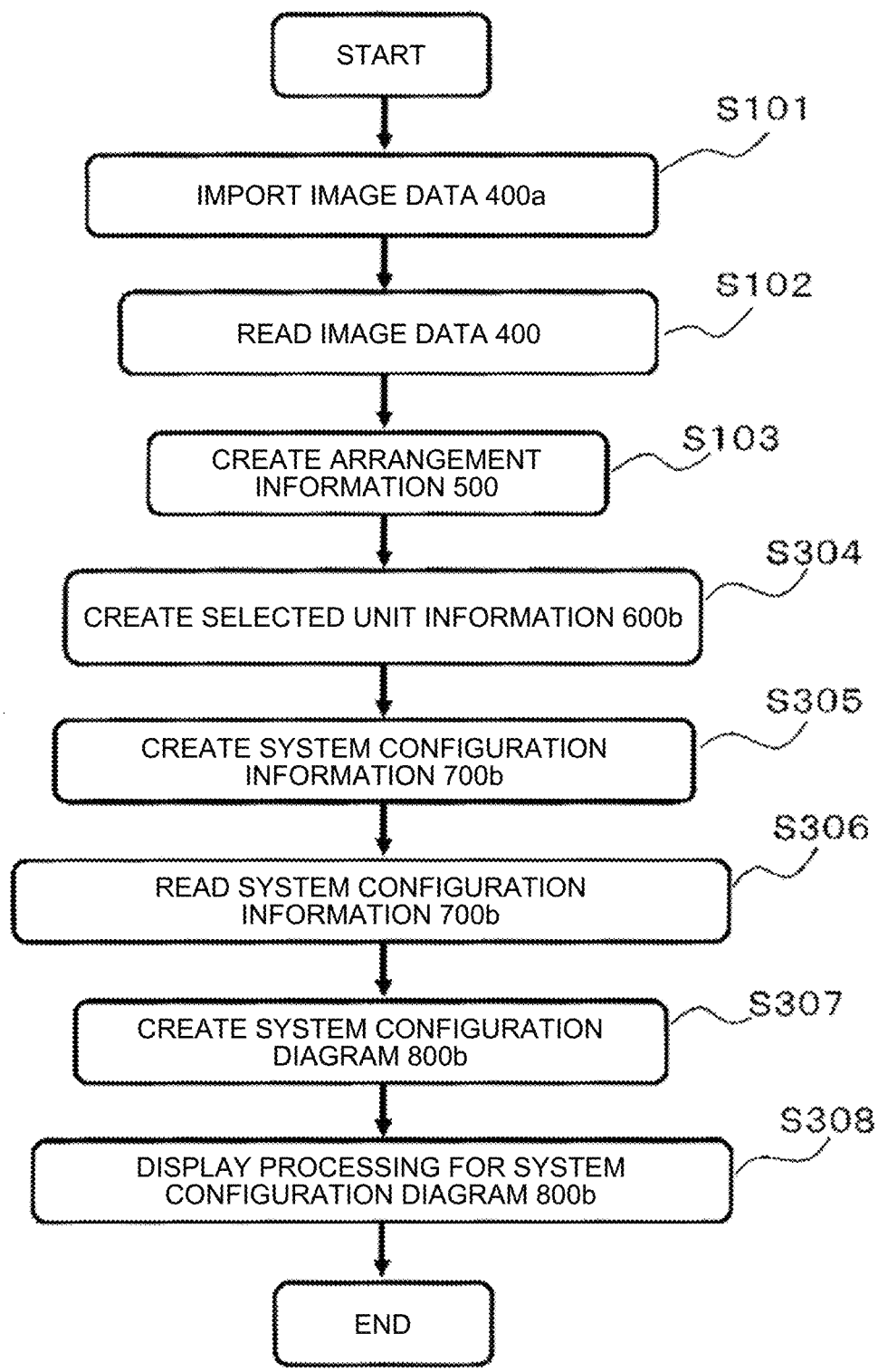
FIG. 23 is a flowchart illustrating the operation of the PLC system construction support device according to the third embodiment of the present invention.

FIG. 23 is a flowchart illustrating the operation of the support program and the support device 10b according to the third embodiment. Hereinafter, the operation of the support program and the support device 10b according to the third embodiment will be described with reference to FIG. 23.

Note that activating the support program installed in the support device 10*b* makes the support device 10*b* ready to start the operation. Note that steps similar to those of the first embodiment are denoted by the same reference signs, and a detailed description thereof is omitted.

Steps S101 to S103 are performed to create the arrangement information 500 in the same manner as in the first embodiment. Subsequently, information indicating features of each unit constituting the PLC system is recognized from the image data 400, the recognized information indicating features of each unit constituting the PLC system is compared with the unit information 301*b* stored in the server 300, and the selected unit information 600*b* is created (step S304). Subsequently, the arrangement information 500 and the selected unit information 600*b* are associated with each other so that the system configuration information 700*b* is created (step S305).

In step S304, the system configuration recognition section 22*b* recognizes information indicating features of each unit constituting the PLC system from the image data 400, and compares the recognized information indicating features of each unit constituting the PLC system with the unit information 301*b* stored in the server 300, thereby selecting the units included in the image data 400 to create the selected unit information 600*b*. Specifically, the image data 400 are analyzed, and information on appearance features of the units is extracted from the image data 400. Here, appearance features are comparative information for comparison with the unit appearance images and unit feature images included in the unit information 301*b* stored in the server 300. That is, appearance features are visually recognizable exterior features of the appearance of units such as unit color combinations, logos, and patterns, and features unique to individual units such as model names and product numbers. Note that information on appearance features is an example of information indicating features of the units recognized from the image data 400.

The system configuration recognition section 22*b* transmits the extracted information on appearance features to the server communication section 23. The information on appearance features is subjected to communication processing by the server communication section 23, and transmitted to the server 300 via the communication I/F 16. The system configuration recognition section 22*b* compares the transmitted appearance features with the unit appearance images and unit feature images included in the unit information 301*b*, and extracts the items of unit information 301*b* corresponding to the information on appearance features.

The extracted unit information 301*b* is transmitted from the server 300 to the support device 10*b*. The unit information 301*b* transmitted from the server 300 is received via the communication I/F 16 and stored in the storage section 12. This operation is repeated for the number of units identified by the above-mentioned arrangement information 500, and the slot numbers are associated with the unit information 301*b*, whereby the selected unit information 600*b* illustrated in FIG. 20 is created. Because the unit information 301*b* in the third embodiment includes unit dimensions, substitute units, production information, and unit prices in addition to unit names, unit appearance images, and unit feature images, the selected unit information 600*b* is created including unit types, model names, unit dimensions, substitute units, production information, and unit prices based on these items of information. Note that the slot numbers of the empty slots identified by the arrangement information 500 are assigned "-" indicating "no unit".

In step S305, the arrangement information 500 and the selected unit information 600*b* described above are associated with each other, whereby the system configuration is generated including the number of units constituting the PLC system included in the image data 400, the arrangement of the units, information on the units (unit types, model names, unit dimensions, substitute units, production information, unit prices, and the like), the number of empty slots, and the arrangement of the empty slots, and the system configuration information 700*b* illustrated in FIG. 21 is created. The created system configuration information 700*b* is stored in the storage section 12.

Next, the system configuration diagram generation section 24*b* retrieves the system configuration information 700*b* stored in the storage section 12 (step S306). Upon reading the system configuration information 700*b*, the system configuration diagram generation section 24*b* adds object information stored in advance in the storage section 12 to the system configuration indicated by the system configuration information 700*b*, and creates the system configuration diagram 800*b* (step S307). Information of the created system configuration diagram 800*b* is stored in the storage section 12.

Finally, the system configuration diagram editor section 25*b* reads the information of the system configuration diagram 800*b* stored in the storage section 12, performs display processing for displaying the system configuration diagram 800*b* on the display section 14, and displays the system configuration diagram 800*b* on the display section 14 (step S308).

Specifically, in step S308, through the display processing of the system configuration diagram editor section 25*b*, the system configuration diagram 800*b* is displayed on the display section 14, showing that the unit with the unit name CC is located in slot number 0, the unit with the unit name AA is located in slot number 1, and the unit with the unit name BB is located in slot number 3, as illustrated in FIG. 22. In addition, it is shown that slot numbers 2 and 4 to 6 are empty slots.

Here, in the third embodiment, because the selected unit information 600*b* includes information on substitute units, production information, and unit prices, the information of the system configuration diagram 800*b* created with the selected unit information 601*b* also includes these items of information. Based on the information on substitute units, production information, and unit prices, the system configuration diagram editor section 25*b* displays supplementary information 80 and unit selection information 81 for the related units as a part of the system configuration diagram 800*b* displayed on the display section 14.

Specifically, based on the production information, the supplementary information 80 is displayed indicating that one or more of the identified units is a unit that has gone out of production, and another one or more of the identified units is a unit scheduled to go out of production. In addition, based on the substitute unit information, a substitutable unit for the unit that has gone out of production and the unit scheduled to go out of production is displayed as the unit selection information 81. Note that there may be a plurality of substitutable units, in which case the substitutable units are displayed selectably. The substitutable units are displayed sortably by unit name and/or unit price. Here, the substitutable units are units of the same unit type, such as power supply units, CPU units, communication units, and I/O units.

In FIG. 22, it is shown that the unit with the unit name AA identified as the unit located in slot number 1 is a unit that has gone out of production, for which the unit names AA-A and AA-A1 are selectably displayed as substitutable units. It is also shown that the unit with the unit name BB identified as the unit located in slot number 3 is a unit scheduled to go out of production, for which the unit name BB-B is selectably displayed as a substitutable unit. After the completion of step S308, the operation of the support device 10b and the support program is completed. Note that a unit that has gone out of production and a unit scheduled to go out of production are examples of a unit to be replaced.

As described above, the support device 10b and the support program according to the third embodiment also use the image data 400, the arrangement information 500, the selected unit information 600b, and the system configuration information 700b, which makes it possible to create a system configuration diagram for a PLC system actually constructed while reducing or preventing selection of a wrong unit due to their false recognition by the user, avoiding the influence of environmental factors such as the preparation of a communication environment, and reducing or preventing lack of unit information. In addition, the system configuration diagram generation section 24b creates the system configuration diagram 800b including information on substitute units, production information, and unit prices, so that the system configuration diagram editor section 25b can display the system configuration diagram 800b including the supplementary information 80 and the unit selection information 81. Consequently, it is possible to replace the unit that has gone out of production or is scheduled to go out of production, and reduce or prevent lack of unit information more effectively.

The configurations described in the above-mentioned embodiments indicate examples of the content of the present invention. The configurations can be combined with another well-known technique, and some of the configurations can be omitted or changed in a range not departing from the gist of the present invention.

In the first to third embodiments, the server is located outside the PLC system construction support device, but the server 300 may be provided in the PLC system construction support device.

A system configuration diagram including the match degrees described in the second embodiment and the supplementary information and unit selection information described in the third embodiment may be created, and candidate units may be displayed when there is some missing unit information in the image data, and the supplementary information and the unit selection information may be displayed when there is a unit to be replaced.

The system configuration diagrams displayed in the first to third embodiments may include not only the items of information described above but also other items of information. In addition, if object information allows the user to clearly discriminate between unit types, the unit names need not be shown in the system configuration diagrams.

In the first to third embodiments, the camera that captures the PLC system, the display section that allows the user to view the system configuration diagrams, and the input section that receives the user's input may be provided in the PLC system construction support device, or may be prepared separately from the PLC system construction support device and configured to be connected to the PLC system construction support device.

The first to third embodiments have described a constructed PLC system in which the baseboard is connected to units and the units are connected to each other via the baseboard. Alternatively, a PLC system without a baseboard may be used as a constructed PLC system. A PLC system without a baseboard is constructed by connecting connectors provided on adjacent units constituting the PLC system. In such a case, there are no empty slots, and thus identification of empty slots is not required.

In the first to third embodiments, the PLC system construction support program is stored in a non-transitory storage medium readable by a computing terminal, and is installed in a computing terminal using the non-transitory storage medium readable by a computing terminal. However, the present invention is not limited to this form. For example, the PLC system construction support program can be stored in an external server so that the user can download and install the PLC system construction support program from the server to a computing terminal.

REFERENCE SIGNS LIST 10, 10a, 10b PLC system construction support device; 11 calculation section; 12 storage section; 13 input section; 14 display section; 16 communication interface; 21 image acquisition section; 22, 22a, 22b system configuration recognition section; 23 server communication section; 24, 24a, 24b system configuration diagram generation section; 25, 25a, 25b system configuration diagram editor section; 300 server; 301, 301a, 301b unit information; 400, 400a image data; 500, 500a arrangement information; 600, 600a, 600b selected unit information; 700, 700a, 700b system configuration information; 80 supplementary information; 81 unit selection information; 800, 800a, 800b system configuration diagram.

The invention claimed is:

1. A non-transitory storage medium readable by a computer, the non-transitory storage medium storing a programmable logic controller system construction support program for creating a system configuration diagram depicting a configuration of a programmable logic controller system constructed, the programmable logic controller system construction support program causing the computer to perform:
    acquiring image data of an image of the programmable logic controller system;
    recognizing, from the image data, arrangement information indicating arrangement of units constituting the programmable logic controller system and information indicating features of the units, creating selected unit information by selecting each of the units, and creating system configuration information including the arrangement information and the selected unit information;
    creating a system configuration diagram based on the system configuration information; and
    performing display processing for displaying the system configuration diagram on a display section, wherein
    from the information indicating the features of the units included in the image data and from unit information stored in a storage and including feature information of units selectable for constructing a programmable logic controller system, match degrees between the units included in the image data and the unit information are calculated, and the selected unit information including the match degrees is created.

2. The non-transitory storage medium according to claim 1, wherein
    when the system configuration diagram includes a plurality of candidate units for one unit included in the image data,
    the programmable logic controller system construction support program causes the computer to perform display processing for displaying the plurality of candidate units in association with the match degrees such that the candidate units are selectable.

3. The non-transitory storage medium according to claim 2, wherein
the selected unit information is created including information on a substitute unit and a production status with respect to the units included in the image data.

4. The non-transitory storage medium according to claim 3, wherein
when the system configuration diagram includes a unit to be replaced that is a unit that goes out of production and/or a unit scheduled to go out of production,
the programmable logic controller system construction support program causes the computer to perform display processing for displaying unit selection information corresponding to the unit to be replaced.

5. The non-transitory storage medium according to claim 1, wherein
the selected unit information is created including information on a substitute unit and a production status with respect to the units included in the image data.

6. The non-transitory storage medium according to claim 5, wherein
when the system configuration diagram includes a unit to be replaced that is a unit that goes out of production and/or a unit scheduled to go out of production,
the programmable logic controller system construction support program causes the computer to perform display processing for displaying unit selection information corresponding to the unit to be replaced.

7. A programmable logic controller system construction support device for creating a system configuration diagram depicting a configuration of a programmable logic controller system constructed, the programmable logic controller system construction support device comprising:
a processor; and
a memory to store a program which, when executed by the processor, perform processes of:
acquiring image data of an image of the programmable logic controller system;
recognizing, from the image data, arrangement information indicating arrangement of units constituting the programmable logic controller system and information indicating features of the units, creating selected unit information by selecting each of the units, and creating system configuration information including the arrangement information and the selected unit information;
creating a system configuration diagram based on the system configuration information;
performing display processing for displaying the system configuration diagram on a display;
calculating, from the information indicating the features of the units included in the image data and from unit information stored in a storage and including feature information of units selectable for constructing a programmable logic controller system, match degrees between the units included in the image data and the unit information; and
creating the selected unit information including the match degrees.

* * * * *